United States Patent Office 3,383,416
Patented May 14, 1968

3,383,416
PROCESS FOR PREPARING AMINOPHENOL
Roland G. Benner, 21 Pine Court,
New Providence, N.J. 07974
No Drawing. Filed July 8, 1965, Ser. No. 470,589
8 Claims. (Cl. 260—575)

ABSTRACT OF THE DISCLOSURE

Para-aminophenol is prepared by reducing nitrobenzene with hydrogen in the presence of aqueous sulfuric acid and a metal-containing catalyst selected from the group consisting of platinum, palladium and mixtures thereof at reaction temperatures ranging from about 60° to 120° C. The reduction of the nitrobenzene is interrupted prior to completion, and the reaction product mixture contains a sufficient amount of unreacted nitrobenzene to form an immiscible layer of nitrobenzene containing the catalyst suspended therein and a separate aqueous layer containing the para-aminophenol product. The aqueous layer is then separated from the nitrobenzene layer, and the latter can be employed in a subsequent reduction step.

This invention relates to an improved method for the manufacture of aminophenols, and more particularly, it concerns the catalytic hydrogenation of nitrobenzene under controlled and critical conditions to produce para-aminophenol in high yields and of improved quality using noble metal catalysts.

It is an object of this invention to provide a commercially practical process for production of para-aminophenol by catalytic reduction of nitrobenzene using certain noble metals as catalysts.

It is another object of the invention to provide an improved process for recovery and reuse of noble metal catalysts employed in manufacture of para-aminophenol by catalytic reduction of nitrobenzene.

There are several well known techniques for the production of para-aminophenol by the catalytic hydrogenation of nitrobenzene. The reaction is assumed to involve the formation of an intermediate, phenyl hydroxyl amine, and then a probable rearrangement to the desired para-aminophenol product. In the past, some processes such as described in U.S. Patent No. 2,198,249 have employed high temperatures and strong sulfuric acid. However, the yields of the product were relatively low and the final product of poor purity. The economics were, therefore, unfavorable because the product invariably required carrying out extensive purification steps prior to its sale or use for other purposes. It is now known that variations in the temperature, pressure and acid concentration of the reaction mixture, even though slight, can cause relatively large and undesirable changes in both yield and quality of the para-aminophenol isolated.

In U.S. Patent No. 2,765,342 there is disclosed a method for making para-aminophenol by reduction of nitrobenbene with hydrogen. It is a feature of this method that nitrobenzene be added at a carefully controlled rate throughout the reduction so that no appreciable amount of it remains undissolved in the acid reaction medium. If the rate of addition exceeds this limit, the catalyst conglomerates in the droplets of undissolved nitrobenzene and the rate of reduction becomes very slow. Such a careful degree of control requires a feeding mechanism of high precision which must be continually adjusted depending on the rate of reduction. The accidental addition of excess nitrobenzene would greatly decrease the rate of reduction and, in turn, lower the output of the equipment. On the other hand, an accidental cessation of the addition of nitrobenzene under conditions too strenuous may cause the formation of troublesome by-products one of which is believed to be para-aminocyclohexanol formed by hydrogenation of para-aminophenol. The producing of any appreciable quantities of these by-products lowers the yield and also makes recovery of para-aminophenol of high quality difficult. Such over-hydrogenation does not occur to any extent while nitrobenzene is present, probably because it preferentially consumes the hydrogen available in solution.

Another disadvantage of previous methods which is not readily apparent is the high cost of catalyst required for reasonable rates of reduction. Although reasonable rates of reduction are obtained with the seemingly small quantities of platinum catalyst in the order of 0.02% to 0.03% of metal based on nitrobenzene, the cost of this catalyst in such quantities is prohibitive unless it can be used several times and then recovered in a suitable manner. At the present cost of platinum these quantities of catalyst have a value of about twice that of all the other raw materials, i.e., the nitrobenzene, sulfuric acid and wetting agent required for para-aminophenol by this method.

The high cost of noble metal catalysts makes their recovery mandatory. These catalysts are usually recovered from the reduction masses by filtration. The wet filter cake is then usually returned to a precious metal refiner for recovery of its metal content. As a result of inevitable losses, the refining charges and the cost of converting the recovered metal to catalyst again; the use of seemingly small amounts of catalyst is very costly.

A method has now been discovered whereby the above objects can be accomplished as well as other objectives which will become apparent in the following description of the invention.

The process broadly contemplates the reduction and rearrangement of nitrobenzene in a one-step catalytic process, under critical reaction conditions, including temperature, reaction acidity and control of the level of reaction as related to the point at which it is terminated as well as other critical features. This latter control is considered especially important in obtaining suitable rates of reduction with commercially practical amounts of catalyst as well as affording a novel method for reuse and recovery of catalyst in either batchwise or continuous operation.

In batchwise reduction of nitrobenzene with hydrogen in the presence of sufficient catalyst, the absorption of hydrogen proceeds rapidly and uniformly until about 85 to 95% of the nitrobenzene has reacted. It was found that essentially all the catalyst is suspended in the nitrobenzene; and that beyond this stage of completion of the reduction, the nitrobenzene is not present in sufficient quantities to suspend all the catalyst. Accordingly, the catalyst deposits on the surface of the reaction vessel and the rate of absorption becomes slow. It was also found that by interrupting the reduction at or before this stage of completion, the nitrobenzene containing essentially all of the catalyst separates from the aqueous reduction mass. It was further found that the catalyst suspended in the nitrobenzene had sufficient activity for reuse in at least four more batch reductions. The nitrobenzene with the suspended catalyst can readily be separated from the reduction mass and then added to a subsequent batch of nitrobenzene to be reduced.

Heretofore, catalysts were recovered from the reduction masses by filtration. The wet catalyst filter cake was then either returned to a precious metal refiner for recovery or occasionally used in another reduction. Besides the expense of filtration and handling the catalyst, losses are inevitable in handling wet filter cakes. It is also difficult to prevent excessive exposure to air which decreases the activity of the catalyst, especially if organic compounds such as para-aminophenol are present. These organics apparently oxidize to tars which coat the catalyst surface and destroy its activity. Also active noble metal catalysts are pyrophoric and may ignite vapors of some volatile organic compounds. Spilling of catalyst cake has caused fires in several operations.

The recovery and reuse of catalyst as a suspension in nitrobenzene is especially advantageous for continuous operation. All the ingredients can be added continuously to a reduction vessel or a cascade system of reduction vessels, the level being held constant by an overflow line connected to a settling chamber. The suspension of catalyst in nitrobenzene which settles to the bottom of the chamber can then be continuously returned (pumped) to the reduction vessel. The clear upper layer of para-aminophenol solution can then be processed for recovery of para-aminophenol by conventional means.

Operable catalysts include platinum and palladium and mixtures of these. The metal catalysts are supported on an inert solid and carbon has been found to be particularly advantageous. It is preferred to use a supported catalyst containing 1% to 5% of platinum and/or palladium on activated carbon although catalysts containing 0.1% to 20% of these metals may be used. Catalysts containing 1 to 5% metal are commercially available. Other concentrations of catalyst can be made in accordance with the teachings of U.S. Patent 2,285,277 or other procedures described in the literature.

It is essential to use nitrobenzene relatively free of catalyst poisons. Commercially available thiophene-free nitrobenzene is suitable. With this type of nitrobenzene, a supported catalyst is preferably employed in catalytic amounts equivalent to 0.01% to 0.10% by weight platinum or palladium based on the nitrobenzene to be reacted. It is preferred to employ new catalyst in quantities so that it will promote the absorption of hydrogen at a reasonable rate initially as well as after it is reused at least one time and preferably three to ten times. However, this invention is not limited to the quantity of catalyst employed. The recovery and reuse of catalyst via a suspension in nitrobenzene can be practiced with as little as 0.002% to as much as 2.0% platinum or palladium based on the nitrobenzene.

As pointed out above, it is very important to control extent of completion of the reaction in order to maintain a suspension of catalyst in the nitrobenzene. If the reaction is not allowed to proceed beyond a certain level short of completion so that at least 5% and preferably 10 to 20% of the nitrobenzene remains unreacted, then substantially all the catalyst remains in the unreacted nitrobenzene. Although larger quantities of unreacted nitrobenzene work equally well, there is no advantage in operating at this level of completion of the reaction. It will be understood, furthermore, that the unreacted nitrobenzene need only be sufficient in amount to effect suspension of the catalyst.

The rate of reaction and the yield of para-aminophenol are influenced by the temperature, acid concentration and partial pressure of hydrogen. At a constant temperature and acid concentration, the rate of reduction is directly proportional to the partial pressure of hydrogen whereas the yield of para-aminophenol obtained is inversely proportional to the pressure. At a constant pressure and acid concentration, the rate of reduction is inversely proportional to the temperature, whereas the yield is directly proportional to the temperature. The temperatures and pressures are therefore, selected so that reasonable yields of para-aminophenol are obtained in a reasonable reduction time.

The temperature of the reaction should be maintained within the limits of 60° to 120° C. and preferably at temperatures between 75° to 100° C. The temperature should be controlled rather carefully since it is desirable to have the reaction proceed as rapidly as possible and still obtain good yield of para-aminophenol. It has been found that the reaction speed can be adjusted to give an overall yield of para-aminophenol plus by-product aniline of over 95%. It is possible to carry out the reaction at fast reduction rates and obtain yields of isolated products of about 75% of para-aminophenol and 15% aniline. Lower reduction rates give up to 85% para-aminophenol. Small amounts of by-product aniline are always obtained in the final reaction mixtures. At temperatures below 60° C. the yields are undesirably low. At temperatures above 120° C. the product is low in purity and highly colored.

Pressures from atmospheric to 20 p.s.i.g. are practical. Although the speed of reaction increases with pressure, higher pressures have been found unnecessary for good results.

To maintain a good rate of reduction, good agitation of the reaction mixture is required. This is especially important since it is a two phase system. Excessive agitation is, however, not required. In general, a stirrer which develops 15 to 25 HP per 1000 gallons is satisfactory.

The acidity of the reaction mixture should be controlled within rather careful limits. It has been found that acid concentrations of 10 to 15% (by weight) are preferable although concentrations of 5 to 20% may be used. It is difficult to recover the product from more dilute solutions. Higher concentration give a product of inferior quality. The quantity of acid should be at least 1.0 equivalents to 5.0 equivalents for each mol of nitrobenzene to be reacted, preferably 1.75 to 2.25 equivalents of acid per mol of nitrobenzene. Lower quantities of acid give low yields of product. High quantities of acid make recovery of the product difficult because of the high concentration of salts formed when the reduction mass is neutralized in order to isolate the product.

In actual practice of the process of this invention a wetting agent such as a quaternary ammonium compound may be employed. The quaternary ammonium compound, if employed, should be water-soluble and stable in the presence of the sulfuric acid. Such compounds generally contain at least one alkyl group having at least 10 and no more than 18 carbon atoms. Illustrative compounds include dodecyl trimethylammonium chloride, octadecyl trimethylammonioum chloride, octadecyl trimethylammonium bromide, octadecyl dimethylethylammonium chloride, dioctadecyl dimethylammonium chloride, tetramethylammonium chloride, and the like. In general, at least 0.01% and up to about 0.2%, based on the weight of the dilute sulfuric acid suspension, is employed in the reaction mixture.

The invention will be illustrated in greater detail by the following examples, although it is not intended in any way to limit the invention thereto.

Example 1

(A) A 5 liter glass-lined reaction vessel provided with vertical baffles and equipped with a stirrer to which was attached a stirrer blade having an area of approximately 4 sq. in. was used for the reaction. The stirrer was driven at 450 to 550 r.p.m. The flask was charged with

| | Grams |
|---|---|
| Thiophene-free nitrobenzene (2.2 mols) | 271 |
| Sulfuric acid, 98% (2.05 mols) | 205 |
| Distilled water | 1700 |
| Platinum-on-carbon catalyst, 5% | 1.4 |
| Dodecyl trimethylammonium chloride | 1.0 |

The reduction was carried out at 82 to 86° C. under slight pressure which was maintained at 20 to 30 mm. by addition of hydrogen. The reaction was continued until about 95,000 cc. of hydrogen was absorbed and 88% of the nitrobenzene had been reduced. At the start of the reduction the rate of absorpton was 275 to 325 cc. of hydrogen per minute. This rate decreased only slightly to 250 to 300 cc. per minute when the reaction was interrupted—five and one-half hours after the start. The reaction mixture was allowed to settle several minutes after which the clear upper aqueous layer was separated from the lower layer of unreacted nitrobenzene which contanied the catalyst in suspension. The lower layer weighed 33 grams equivalent to 12% of the nitrobenzene charged.

The upper layer was transferred to a distilling flask and 300 cc. water was distilled off. The distillate contained a small amount of nitrobenzene which had been dissolved in the aqueous layer. The pH of the solution remaining in the flask was adjusted to 6.0 and the distillation was continued to remove the aniline which was formed as a by-product of the reduction. 8 grams of activated carbon was then added to the flask which was agitated for 5 minutes at 98 to 100° C. and then filtered. The pH of the filtrate was adjusted to 7.2 with more ammonia and then cooled to 10° C. under an atmosphere of nitrogen. The crystals of para-aminophenol were filtered and dried. The dry para-aminophenol was almost white and analyzed 99.1%. It weighed 154 grams which is a 73% yield based on the nitrobenzene reacted. The filtrate contained 12.5 grams more para-aminophenol by analysis which is equivalent to a 6% yield based on nitrobenzene reacted making the total yield 79%. The distillate collected during removal of aniline contained 28 grams aniline which is equivalent to a yield of 15% based on nitrobenzene reacted.

Another run was carried out under the same conditions as Example 1(A) except that 100% of the nitrobenzene was reacted during a reaction period of 7½ hours. The catalyst was completely suspended in the resulting aqueous reaction product mixture. In order to effect separation of the catalyst, the entire reaction product mixture had to be filtered. During required recovery of the catalyst, it was further found that the catalyst was undesirably exposed to the atmosphere.

Example 2

The same flask, described in Example 1, was charged with

| | Grams |
|---|---|
| Nitrobenzene (2.0 mols) | 246 |
| Nitrobenzene containing catalyst recovered from Example 1 | 33 |
| Sulfuric acid, 98% | 205 |
| Distilled water | 1400 |
| Distillate containing nitrobenzene recovered from Example 1 | 300 |
| Dodecyl trimethylammonium chloride | 1.0 |

The reduction was carried out as described in Example 1. The reaction was again interrupted after 95,000 cc. of hydrogen had been absorbed and 85% of the nitrobenzene had been reduced. The reaction mixture was worked up as described in Example 1. The time of reaction was again five and one-half hours. The yield of para-aminophenol was 163 grams equivalent to 75% of the new nitrobenzene charged.

Example 3

Three more reductions were carried out as described in Example 2 without addition of more catalyst. The yields of isolated para-aminophenol based on new nitrobenzene charged were 73%, 76% and 78% respectively. The times of reduction were 5¾ hours, 6¼ hours and 6¾ hours, respectively, and the amount of nitrobenzene reduced ranged from about 84 to 86%.

Example 4

Another reduction was carried out as described in Example 2 with the recovered catalyst from the fifth reduction plus 0.4 gram new catalyst. The time of reduction was 5 hours, and the amount of nitrobenzene reduced was 84%. A 74% yield of excellent quality para-aminophenol (based on new nitrobenzene charged) was obtained.

Example 5

A reduction of nitrobenzene was carried out as described in Example 1 except that 3.0 grams of 5% palladium-on-carbon catalyst was used in place of platinum catalyst. After the reaction the catalyst was essentially all suspended in the unreacted nitrobenzene. The reaction required 5 hours and a 70% yield of para-aminophenol (based on nitrobenzene reacted) was obtained with about 85% of the nitrobenzene being reduced.

Example 6

Except that a temperature of 90° to 95° C. was used, another reduction was carried out as described in Example 1. The time of reduction was 12 hours. The yield of isolated para-aminophenol was 83% based on nitrobenzene. The unreacted nitrobenzene, about 15%, contained essentially all the catalyst in suspension.

The above examples show the advantages in recovery and reuse of catalyst by carrying out the reaction short of completion. Not only is the catalyst reused and recovered this way, but the slow period of reduction when nearly all the nitrobenzene has been reduced is avoided. For instance, in Example 1(A) the reduction was 88% complete in 5½ hours. In order to reduce the remaining 12% of the nitrobenzene, an additional 1½ to 2 hours would be required with the quantity of catalyst that was employed in Example 1(B).

In the event that complete reduction of the nitrobenzene occurs accidentally, catalyst suspension can be accomplished by the addition of a sufficient amount of nitrobenzene. In general, such a procedure requires stirring or agitating the reaction mixture.

While particular embodiments of this invention are shown above, it will be understood that the invention is obviously subject to variations and modifications without departing from its broader aspects.

What is claimed is:
1. A process for the production of para-aminophenol which comprises reducing nitrobenzene with hydrogen in a reaction zone at a temperature of from about 60° to 120° C. in the presence of from about 5 to 20% by weight of aqueous sulfuric acid and a metal-containing catalyst selected from the group consisting of platinum, palladium and mixtures thereof wherein the reduction of the nitrobenzene is interrupted prior to completion to yield a reaction product mixture containing a sufficient amount of unreacted nitrobenzene to form an immiscible layer of nitrobenzene containing the catalyst suspended therein and a separate aqueous layer containing para-aminophenol, and separating the aqueous layer from the nitrobenzene layer containing the catalyst.

2. The process of claim 1 wherein said temperature is within the range of about 75° to 100° C.

3. The process of claim 1 wherein said catalyst is platinum.

4. The process of claim 1 wherein said catalyst is palladium.

5. The process of claim 1 wherein said catalyst is a mixture of platinum and palladium.

6. The process of claim 1 wherein said unreacted nitrobenzene in the immiscible layer is at least 5% of the nitrobenzene feed.

7. The process of claim 1 wherein said hydrogenation is carried out at a pressure within the range of about atmospheric to 20 p.s.i.g.

8. The process of claim 1 wherein said recovered immiscible layer containing the catalyst suspended therein is recycled to hydrogenation step.

References Cited

FOREIGN PATENTS 856,366  12/1960  Great Britain.

CHARLES B. PARKER, *Primary Examiner.*

P. C. IVES, *Assistant Examiner.*